(12) United States Patent
Ozaki

(10) Patent No.: US 9,073,694 B2
(45) Date of Patent: Jul. 7, 2015

(54) CONVEYOR BELT

(71) Applicant: Tsubakimoto Chain Co., Osaka (JP)

(72) Inventor: Hajime Ozaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 12 days.

(21) Appl. No.: 13/845,276

(22) Filed: Mar. 18, 2013

(65) Prior Publication Data

US 2013/0277184 A1  Oct. 24, 2013

(30) Foreign Application Priority Data

Apr. 18, 2012  (JP) ................................. 2012-094757

(51) Int. Cl.
*B65G 17/06* (2006.01)
*B65G 15/30* (2006.01)
*B65G 17/08* (2006.01)

(52) U.S. Cl.
CPC ................ *B65G 15/30* (2013.01); *B65G 17/08* (2013.01)

(58) Field of Classification Search
CPC ................................... B65G 15/30; B65G 17/08
USPC ................... 198/853, 850, 851, 837, 839, 841
See application file for complete search history.

(56) References Cited

U.S. PATENT DOCUMENTS

| | | | | |
|---|---|---|---|---|
| 4,880,107 A * | 11/1989 | Deal | ............................. | 198/779 |
| 5,224,587 A * | 7/1993 | Robertson | ...................... | 198/831 |
| 6,148,990 A * | 11/2000 | Lapeyre et al. | ............... | 198/779 |
| 6,708,818 B2 * | 3/2004 | Kato et al. | ..................... | 198/853 |
| 7,410,048 B2 * | 8/2008 | Verduijn et al. | ............... | 198/852 |
| 7,967,132 B2 * | 6/2011 | Menke et al. | ................. | 198/853 |
| 8,371,437 B2 | 2/2013 | Menke et al. | | |
| 2006/0151304 A1 | 7/2006 | Ozaki | | |
| 2012/0073938 A1 | 3/2012 | Ozaki | | |

FOREIGN PATENT DOCUMENTS

| | | |
|---|---|---|
| EP | 0493349 A1 | 7/1992 |
| EP | 1751037 B1 | 2/2007 |
| EP | 2014585 A2 | 7/2007 |
| JP | 2004262600 | 9/2004 |
| JP | 2007-537113 | 12/2007 |
| WO | 2005110897 A1 | 11/2005 |

OTHER PUBLICATIONS

European Patent Office, European Search Report on Application 13158557-2, dated Sep. 25, 2013.

* cited by examiner

*Primary Examiner* — William R Harp
(74) *Attorney, Agent, or Firm* — Howson & Howson LLP

(57) ABSTRACT

In a conveyor belt composed of hinged modular links, one or more of the links are composed of multiple parts at least one of which is in the form of an guide-engaging element having a protruding guide-engaging section, a pair of laterally spaced hinge knuckles on a leading or trailing edge of a base, and a single hinge knuckle on the opposite edge. The single hinge knuckle is positioned opposite the mid point between the two laterally spaced hinge knuckles. The sum of the cross-sectional areas of the two laterally spaced hinge knuckles is equal to the cross-sectional area of the single hinge knuckle. The widthwise cross-sectional area of the base of the guide-engaging element is equal to the widthwise cross-sectional area of any portion of the base of any other modular link in the belt having the same width as that of the base of the guide-engaging element.

4 Claims, 6 Drawing Sheets

CONVEYOR BELT

CROSS-REFERENCE TO RELATED APPLICATION

The disclosure of Japanese Patent Application No. 2012-094757, upon which this patent application is based, is hereby incorporated by reference in its entirety.

FIELD OF THE INVENTION

This invention relates to a conveyor belt comprising multiple modular links of synthetic resin, interconnected with one another by connecting pins to form an endless loop. A conveyed article can be placed on, and conveyed by, a conveying surface of the belt facing toward the outside of the endless loop.

BACKGROUND OF THE INVENTION

In a known conveyor belt, multiple modular links made of synthetic-resin are interconnected to one another by connecting pins along a longitudinal defined by the length of the conveyor belt and by the direction of its travel. Each of the modular links includes a plurality of boss sections at its leading and trailing edges, each boss section having an insertion hole adapted to receive a connecting pin. The boss sections are provided on the leading and trailing ends of the modular link in a staggered pattern.

Examples of known conveyor belts are described in Japanese patent publication No. 2004-262600, published Sep. 24, 2004, and in U.S. Pat. No. 8,371,437, granted on Feb. 12, 2013.

The conveyor belt of Japanese patent publication No. 2004-262600 can incorporate a tab attachment as shown in FIG. 6, configured to prevent uplifting of the belt, i.e., upward movement of the article-conveying surface of the belt, due to tensile force in a concavely curved zone of the travel of the belt. Uplift prevention is provided by bringing a guide-engaging section of the tab attachment into engagement with an uplift-preventing guide rail extending along a part of the path of circulation of the belt.

FIG. 6 is a side view of the tab attachment in a conventional conveyor belt 500. As shown in FIG. 6, the tab attachment 510 includes forward and rearward pin holes, each adapted to receive a connecting pin, and an engaging section 512, closer than the pin holes 511 to the inside of the loop formed by the belt.

A modular link of the conveyor belt is machined to remove boss-sections, and the tab attachment is inserted so that its pin holes 511 are at the positions previously occupied by pin holes of the modular link. Connecting pins are then inserted through the pin holes of the modular link and through pin holes 511 of the tab attachment.

In the conveyor belt having the configuration described in Japanese Unexamined Patent Application Publication No. 2007-537113, a guide-engaging section is an integral part of a modular link that extends across the full width of the belt.

A drawback of the conveyor belt 500 having the tab attachment shown in FIG. 6 is that the front and rear pin holes 511 of the tab attachment are connected to each other by a V-shaped connection instead of a connection extending linearly from one of the pin holes 511 to the other. Because the V-shaped connecting structure replaces a direct connection, the V-shaped connecting structure can decrease the overall tensile strength of the conveyor belt.

Another drawback is that, in those cases in which the boss sections of the modular link are arranged in a staggered pattern, that is the boss sections that extend in the direction of belt travel are offset widthwise from the boss sections that extend in the opposite direction, the pin holes 511 of the tab attachment will necessarily be offset from each other in the widthwise direction, causing the tab attachment to have an asymmetric shape so that tensile forces applied to the tab attachment tend to twist and deform the tab attachment.

In the conveyor belt of U.S. Pat. No. 8,371,437, the guide-engaging sections are fixed to a specific portion of a modular link that extends across the full width of the belt. Accordingly, different modular links are required to accommodate different desired positions of the guide-engaging part in the direction of the width of the belt.

This invention addresses the above-mentioned problems by providing a conveyor belt having uplift-preventing engagement portions that maintain the tensile strength of belt, avoid deformation, and are easily incorporated into a modular at any desired widthwise position and in any desired combination.

SUMMARY OF THE INVENTION

The conveyor belt in accordance with the invention comprises a plurality of modular links arranged sequentially in a longitudinal direction to form an endless loop having an interior, and exterior, a longitudinal direction extending lengthwise around the loop, and a widthwise direction. The modular links are interconnected with one another by connecting pins, and cooperatively form a conveying surface facing the exterior of the loop. Articles to be conveyed may be placed on the conveying surface.

The modular links are composed of synthetic resin, and each modular link has longitudinally spaced leading and trailing edges. Plural hinge knuckles, having pin-receiving insertion holes, are formed on both the leading and trailing edges. The hinge knuckles on the leading edge are laterally displaced relative to the hinge knuckles on the trailing edge so that the hinge knuckles on the leading edge of each modular link can be interleaved with hinge knuckles on the trailing edge of a preceding modular link having a substantially identical hinge knuckle configuration.

The modular links include a plurality of modular links with no guide-engaging section, and a plurality of links each with a guide-engaging section for engagement with a guide rail. Each link with a guide-engaging section is disposed between preceding and following modular links with no guide-engaging section. Each of the modular links with a guide-engaging section comprises a link base having a conveying surface and a guide-engaging section protruding toward the inside of the endless loop for engagement with a guide rail disposed along a path of travel of the belt. Each of the modular links with a guide engaging section comprises a link element having two pin holes spaced from each other in said widthwise direction of the belt and axially aligned with each other on a common pin hole axis. These two pin holes are formed respectively in first and second hinge knuckles that extend from the link element in the longitudinal direction of the belt. An additional single pin hole is formed in a third hinge knuckle that extends longitudinally in a direction opposite to the direction in which said first and second hinge knuckles extend from the link element. The additional single pin hole of each link element with a guide-engaging section is positioned at a location such that its projection in the longitudinal direction of the belt is located between the two other pin holes of the same link element.

The above-described configuration provides for engagement of a guide-engaging section with a guide rail without impairing the tensile strength of the belt. Furthermore, since the link element with the guide-engaging section has two knuckles laterally spaced from each other on one edge and one knuckle on the opposite edge at a location longitudinally aligned with a location midway between the two laterally spaced knuckles, the link element is substantially symmetrical with respect to a line extending in the direction of movement of the belt, and twisting and deformation of the element having the guide-engaging section can be prevented.

Link elements with the guide-engaging section can be easily incorporated into a conveyor belt along with modular links without guide-engaging sections, and modular link portions without guide-engaging sections, in any of a wide variety of positions and combinations According to a second aspect of the invention, the cross-sectional area of the third hinge knuckle, taken on a plane in which the axis of the pin hole in the third hinge knuckle lies, is equal to the sum of the cross-sectional areas of the first and second hinge knuckles taken on a plane in which the common pin hole axis of the pin holes of the first and second hinge knuckles lies.

By equalizing these cross-sectional areas it is possible to optimize the strength of the link element while minimizing the amount of material and weight of the link element.

According to a third aspect of the invention, the widthwise cross-sectional area of each of the modular link elements with a guide-engaging section, excluding the cross-sectional area of the guide-engaging section, is equal to the widthwise cross-sectional area of a portion of each of the modular links without a guide-engaging section, where said portion has the same width as that of the last mentioned modular link element with a guide-engaging section. By equalizing these cross-sections, the tensile strength of the portion, between the hinges, of the modular link element with a guide-engaging section is made substantially equal to the tensile strength of a corresponding portion, between the hinges, of modular links without a guide-engaging section. Thus it is possible to least reduce or unevenness in tensile strength across the entire conveyor belt.

Other objects, features, and advantages of the invention will be apparent in view of this disclosure to those skilled in the art.

DETAILED DESCRIPTION OF THE PREFERRED EMBODIMENTS

Figure 1:
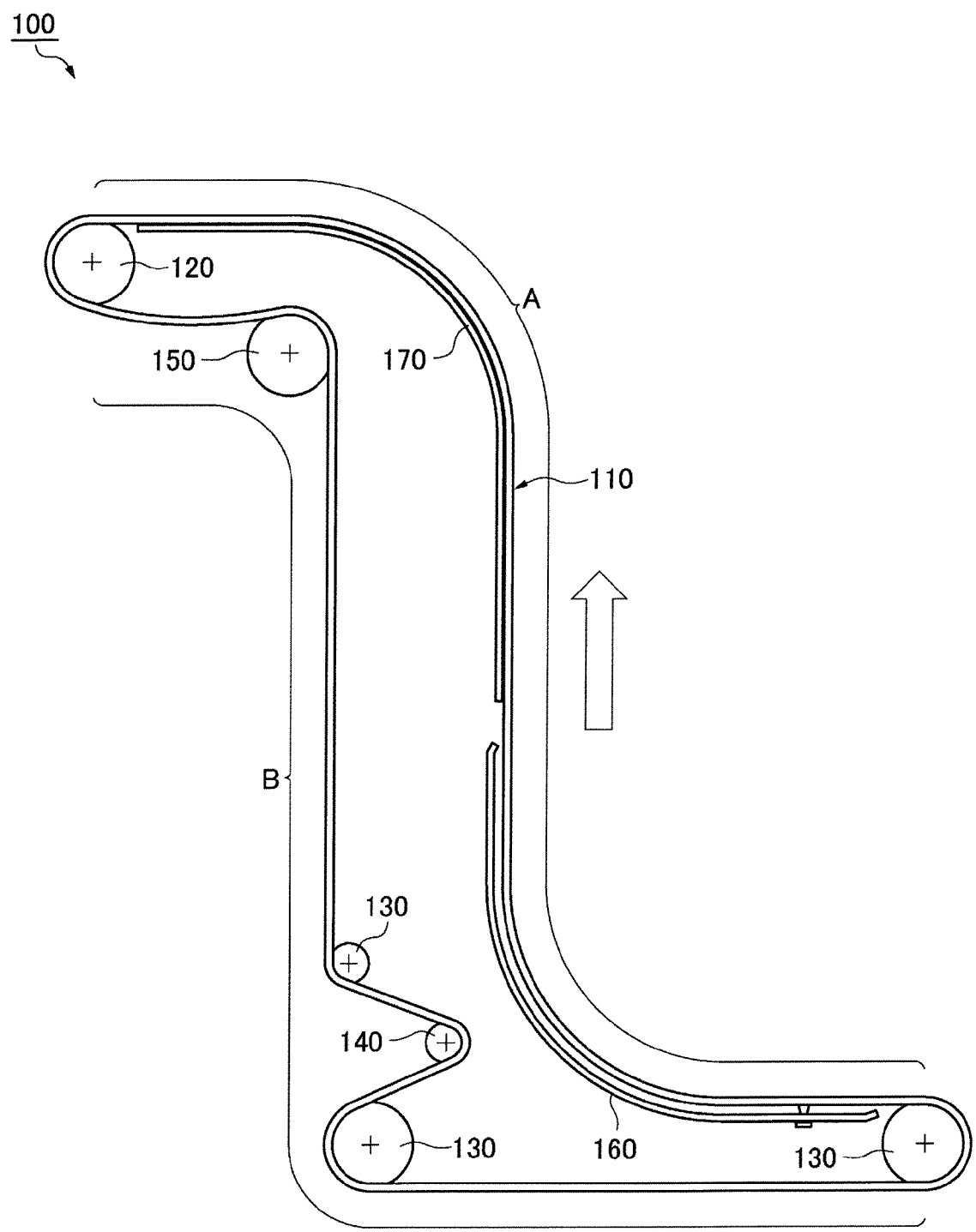
FIG. 1 is a schematic side elevation of a conveyor in accordance with the invention.

The conveyor belt in accordance with the invention comprises multiple modular links arranged in sequence in a longitudinal direction to form an endless loop, and interconnected to one another by connecting pins extending transverse to the longitudinal direction. The links cooperate to form a conveying surface on the outside of the loop upon which articles to be conveyed can be placed.

The modular links are made of synthetic resin and each link include a plurality of hinge knuckles. Each hinge knuckle includes an insertion hole for receiving a connecting pin therein. Hinge knuckles are provided both along a leading edge and a trailing end of each modular link in a staggered pattern such that the leading edge knuckles of each link can be interleaved with the trailing edge knuckles of preceding link having a similar knuckle configuration.

The modular links of the belt are composed of two types. The first type of modular link has no uplift-preventing guide-engaging section adapted for engagement with an uplift-preventing guide rail. The second type of modular link has an engaging portion adapted for engagement with an uplift-preventing guide rail. The two types of modular links can be arranged in alternating sequence along the length of the belt to form a belt in the shape of a closed loop, and both types of modular links have surfaces that cooperate to form a conveying surface on the outside of the loop.

In each modular link having a guide-engaging section, the guide-engaging section protrudes toward the inside of the loop so that it can come into engagement with an uplift-preventing guide rail located inside the loop.

The guide-engaging section provided on a link element that forms a part of the second type of modular link. This link element has two pin holes aligned with, and spaced from, each other in the widthwise direction of the belt. These pin holes are formed in knuckles that extend from the link element in the longitudinal direction of the belt. The link element has a single pin hole in a knuckle that extends longitudinally in the opposite direction from the link element. The single pin hole of each link element having a guide-engaging section is positioned at a location such that its projection in the longitudinal direction of the belt would be located between the two other pin holes of the same link element. The guide-engaging link element having the above-described configuration contributes to the maintenance of high tensile strength in the conveyor belt as a whole, avoids twisting and deformation, and allows for simple incorporation into a conveyor belt at any of various desired positions and in any of various combinations.

A conveyor incorporating the belt of the invention can also incorporate one or more sprockets in driving engagement with the conveyor belt as well as idlers for guiding the belt, and an uplift-preventing guide rail arranged along a portion of the loop-shaped path of travel of the belt and adapted to be engaged by an uplift-preventing guide-engaging section protruding toward the inside of the loop. The belt comprises two types of modular links, i.e., modular links that do not have an uplift-preventing guide-engaging section, and modular links that have an engaging portion. The engaging portion is provided on an element that is formed separately from other portions of modular link of which it is a part, and secured to those portions by connecting pins, all of the modular links, including the separately formed element having the engaging portion, have surfaces that cooperate to form a conveying surface facing the exterior of the loop formed by the belt.

The link element having the guide-engaging section comprises a link base having a conveying surface. The guide-engaging section protrudes from the link base toward the inside of the loop and is shaped so that it can be brought into engagement with an uplift-preventing guide rail.

Two pin holes are provided in hinge knuckles on a leading or trailing edge of the link base, and still another pin hole is provided in a hinge knuckle on the opposite edge of the base. the first two knuckles are spaced laterally from each other, and the third knuckle, on the opposite edge of the link base is positioned opposite a point midway between the first two hinge knuckles.

Various belt configurations can incorporate one or more link elements having a guide-engaging section. One or more modular links having a guide engaging section can be incorporated into the belt, along with modular links having no guide-engaging section, in any desired number or pattern. The widthwise dimensions of the modular links do not need to be equal. Likewise, the lengthwise dimensions of the modular links do not need to be equal. Suitable materials for use in making the components of the conveyor belt include synthetic resins such as polypropylene, polyethylene, acetal resins, and nylons.

Plural elements, each having a guide-engaging section, can be incorporated in widthwise spaced relationship into a single modular link.

FIGS. 1-5D show an example of a conveyor apparatus 100 according to the invention.

Figure 2:
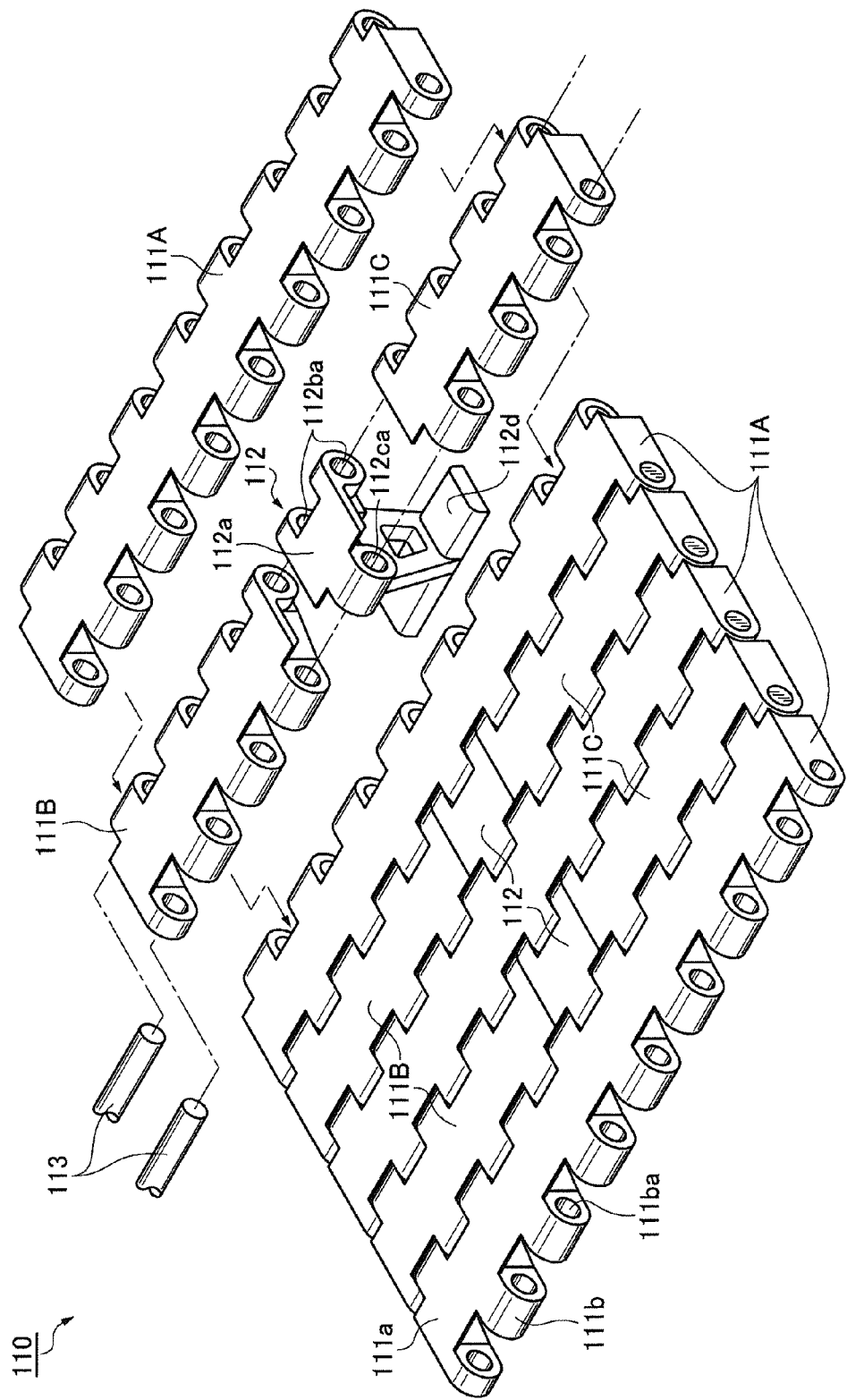
FIG. 2 is an exploded perspective view of a conveyor belt of the conveyor in accordance with the invention.

FIGS. 1 and 2 show a conveyor apparatus 100 that includes an endless conveyor belt 110 composed of multiple modular links including unitary modular links 111A and three-part modular links composed of parts 111B, 111C, which are similar to, but shorter than, links 111A, and engagement parts 112. The modular links are made of synthetic resin and are arranged in sequence in such a way as to form an endless loop and interconnected with one another by connecting pins 113. The modular links cooperatively provide a conveying surface, composed of surfaces of the individual modular links, e.g., surfaces 111a and 112a. The conveying surfaces face the outside of the endless loop. An article (not shown) to be conveyed is placed on the conveying surface for transport from one location to another along the path of travel of the belt. As shown in FIG. 1, a drive sprocket 120 is in mesh with the belt. Sprockets 130 are provided at appropriate locations to control the path of travel of the belt and may also be motor-driven so that they serve as additional belt-driving sprockets. An uplift-preventing guide rail 160 is arranged along the path of the conveyor belt 110 and is adapted to be engaged by one or more uplift-preventing guide-engaging sections 112d (FIG. 2) that protrude toward the inside of the loop formed by the conveyor belt 110. A tensioner roller 140, biased against the belt by a tensioner (not shown) can be used to maintain tension in the belt and a roller 150, in contact with the belt on the outside of the loop can be used to establish the path of travel of the belt and to maintain the belt in engagement with the driving sprocket 120 over an adequate angle.

The uplift-preventing guide rail 160 is provided adjacent an externally concave part of the belt, and a convex guide 170 is provided adjacent an externally convex part of the belt.

The drive sprocket 120 is rotated by a motor (not shown) in a counterclockwise direction in FIG. 1, to move the conveyor belt 110 in the direction indicated by the arrow, so that the conveyor belt 110 travels from a conveyance side A to a return side B where the conveyor belt 110 returns to a conveyance start position without a conveyed article thereon. Thus an article to be conveyed proceeds along part A from a conveyance starting position to a conveyance end position, while the belt returns to the conveyance start position along return side B. Sprockets 130, if motor-operated, are similarly caused to rotate in a direction to move the belt in the direction of the arrow in FIG. 1.

The uplift-preventing guide rail 160 is formed adjacent the conveyance side A of the belt on the inside of the loop formed by the belt. The side of the rail facing the belt has a concave shape when viewed from the side as in FIG. 1. Guide rail 160 can be engaged by the guide-engaging section 112d (FIGS. 2-5B) of the modular link element 112. Engagement of the guide-engaging section with the guide rail resists the tendency of tensile forces in the conveyor belt 110 to lift the conveyor belt away from the concave guide rail.

The convexly curved guide 170 guides a part of the conveyor belt 110 that is pressed against the guide 170 by tensile forces in the belt.

Referring to FIG. 2, the conveyor belt 110 includes multiple one-part modular links 111A, and multiple three-part modular links composed of two parts 111B and 111C, and rail engaging elements 112. The modular links are arranged in a sequence and interconnected to one another by connecting pins 113 to form a closed loop, with an outwardly facing surface upon which conveyed articles can be placed and conveyed. The modular links are composed of synthetic resin, and each includes a plurality of hinge knuckles, e.g., knuckles 111b, each having an insertion hole, e.g., 111ba for insertion of a connecting pin 113. The hinge knuckles are arranged in spaced relation in the direction of the width of the belt, and in a staggered pattern such that the knuckles on a leading edge of a modular link can enter spaces between knuckles formed on the trailing edge of an immediately preceding modular link having an identical knuckle pattern.

The modular links 111A, which have no guide-engaging section are unitary elements from one end to the other across the full width of the belt. On the other hand, in the embodiment shown, the modular links that have guide-engaging sections are three-part links, each composed of two elements 111B and 111C, and a guide engaging element 112. Each of the elements 111B has a length that is shorter than half of the full width of the belt by an amount corresponding to half the width of the guide engaging element 112. In each three-part modular link, guide engaging element 112 is disposed between elements 111B and 111C.

In alternative embodiments, the modular link section 111A, and elements 111B and 111C can be made longer or shorter in the belt width direction than the corresponding elements shown in FIG. 2.

The pin insertion holes 111ba, into which the connecting pins 113 are inserted, are formed in each of the hinge knuckles 111b.

Figure 3:
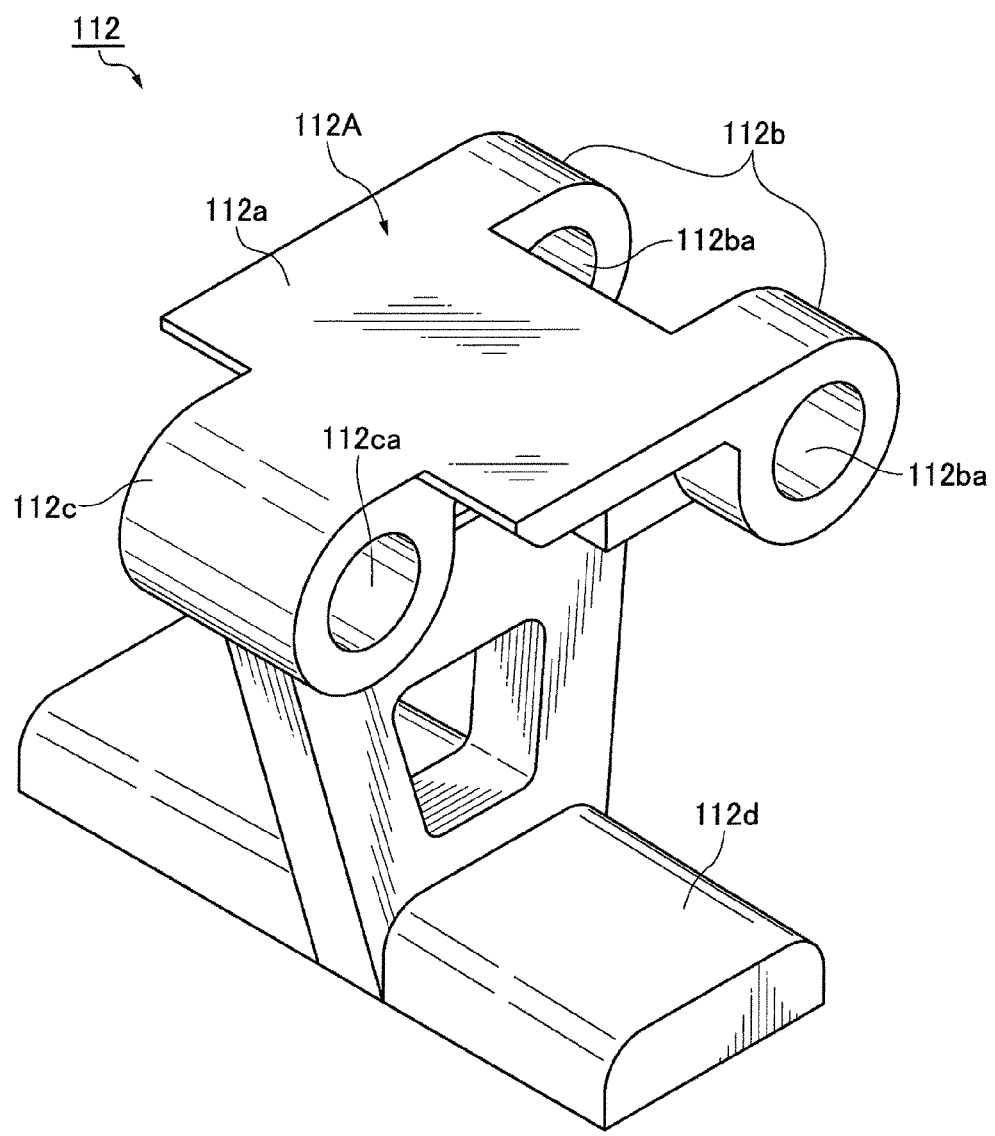
FIG. 3 is a perspective view of a modular link having a guide-engaging section adapted to be brought into engagement with an uplift-preventing guide.

In the guide engaging element 112, shown in FIG. 3, hinge knuckles 112b and hinge knuckle 112c are arranged in a staggered pattern on the leading and trailing edges, with knuckle 112c disposed directly opposite a mid point between knuckles 112b. A first pin hole 112ba, into which a connecting pin 113 can be inserted, is provided in each of knuckles 112b. A pin hole 112ca, into which another connecting pin 113 can be inserted, is provided in knuckle 112c.

Element 112, which has a guide-engaging section, is arranged between the modular link parts 1113 and 111C. The modular link composed of parts 111B, 112 and 111C can be connected to a modular link 111A by a connecting pin.

As shown in FIGS. 3-5B, the conveyor belt 110 includes the guide-engaging element 112 comprising a base 112A having a conveying surface 112a facing toward the outside of the loop formed by the belt, and a guide-engaging section 112d protruding toward the inside of the loop and adapted to come into engagement with and uplift-preventing guide rail 160. Aligned pin holes 112ba in knuckles 112b are adapted to receive a connecting pin, and a second pin hole 112ca in knuckle 112c is adapted to receive another connecting pin 113. The second pin hole 112ca is located opposite a point midway between pin holes 112ba.

The three-part modular link composed of parts 111B, 112 and 111C has a structure equivalent to that of the one-part modular link 111A, with the same number of number knuckles. Thus with the inclusion of the guide engaging element, the three-part modular link has the same tensile strength as the one-part modular link. Moreover, element 112, which includes the guide-engaging section is symmetrical with respect to a line extending in the longitudinal direction of the belt, and is therefore resistant to twisting and deformation as a result of tensile forces exerted on the belt.

The one-piece modular links 111A and the three-part modular links composed of parts 111B, 112 and 111C, can be arranged in any desired combination and pattern along the length of the belt. Moreover, if elements 111B are shortened and elements 111C are lengthened, or if elements 111C are shortened and elements 1113 are lengthened, the guide engaging element 112 can be disposed in any of a variety of different positions in the widthwise direction of the belt. It is even possible to construct a multi-part modular link such as a four part link having two guide engaging elements similar to element 112.

Figure 4A:
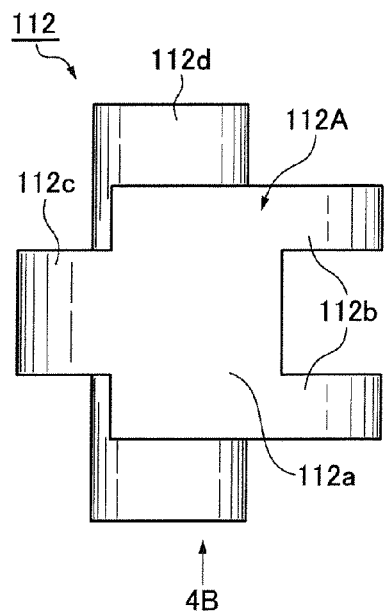
FIG. 4A is a plan view of the modular link.
Figure 4B:
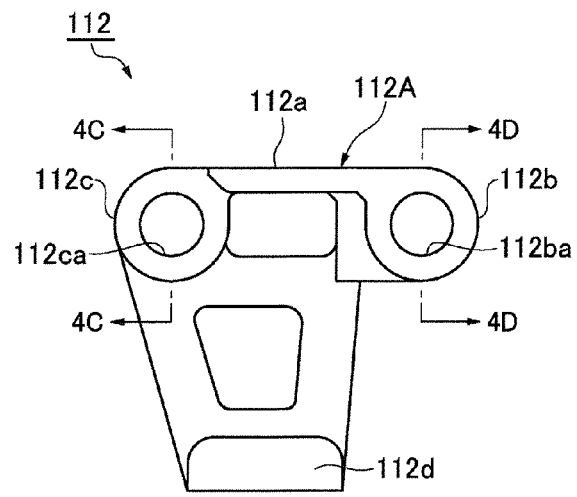
FIG. 4B is a side elevational view of the modular link as seen along the direction indicated by arrow 4B of FIG. 4A.
Figure 4C:
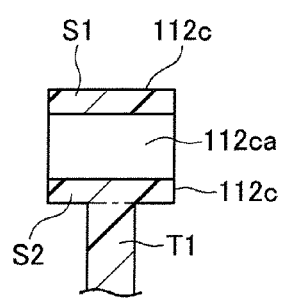
FIG. 4C is a cross-sectional view taken on section plane 4C-4C in FIG. 4B.
Figure 4D:
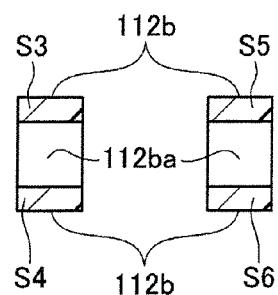
FIG. 4D is a cross-sectional view taken on section plane 4D-4D in FIG. 4B.
Figure 5A:
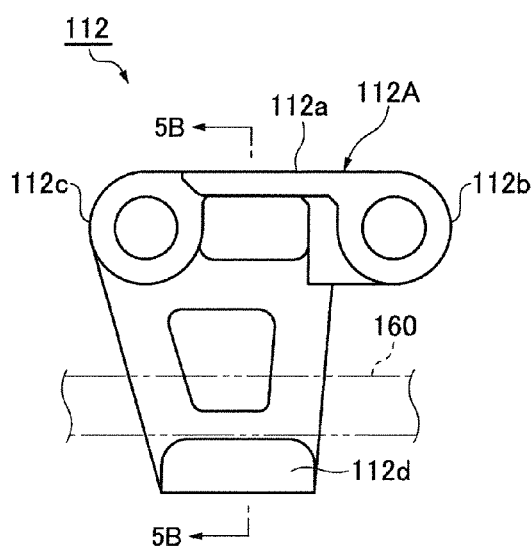
FIG. 5A is a side elevational view of the modular link of FIG. 4B, showing in broken lines an uplift-preventing guide engaged by the guide-engaging section of the modular link.
Figure 5B:
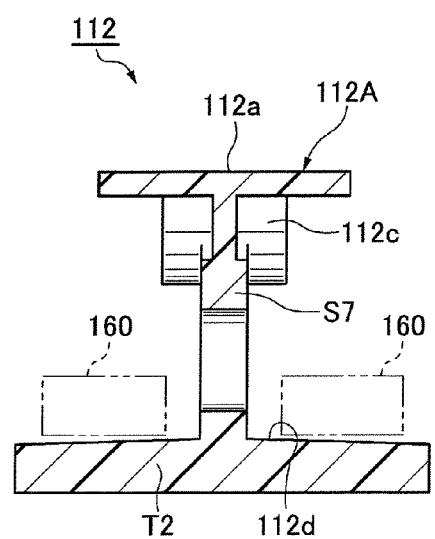
FIG. 5B is a cross-sectional view taken on section plane 5B-5B in FIG. 5A.
Figure 5C:
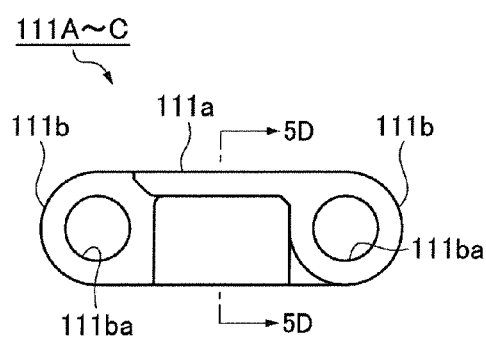
FIG. 5C is a side elevational view of a modular link having no guide-engaging section.
Figure 5D:
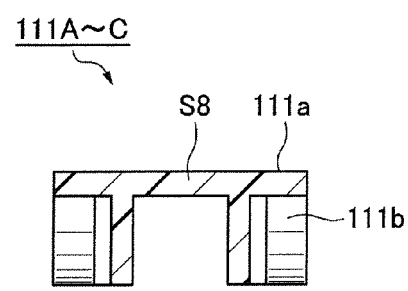
FIG. 5D is a cross-sectional view taken on section plane 5D-5D in FIG. 5C.
Figure 6:
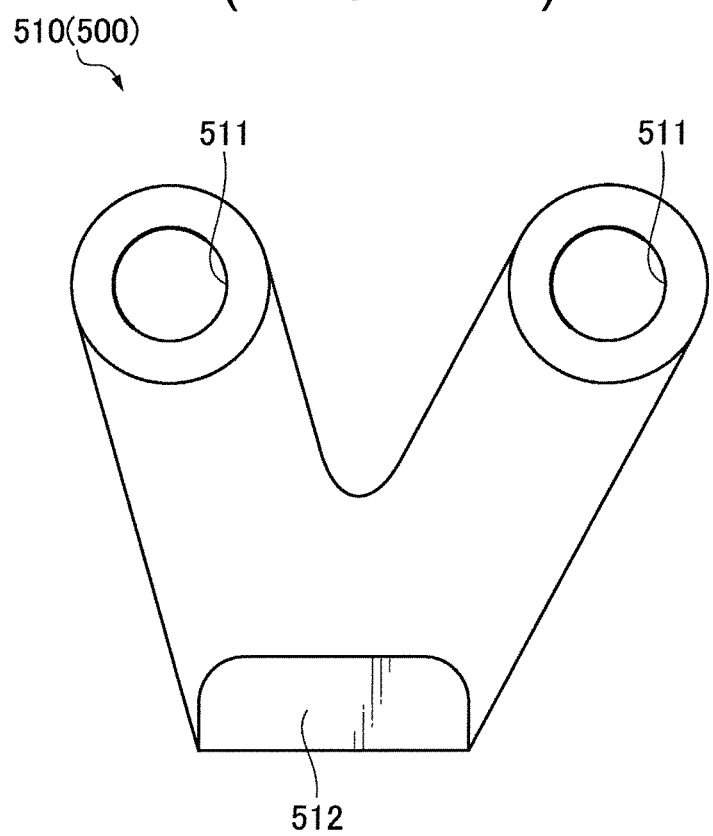
FIG. 6 is a side view of a conventional tab attachment.

As shown in FIGS. 4B-4D, the cross-sectional area of knuckle 112c, which is the sum of the cross-sectional areas S1 and S2 in FIG. 4C, is equal to the sum of the cross-sectional areas S3, S4, S5, and S6 of the opposite knuckles 112b. Thus, the combined strength of knuckles 112b can be made equal to the strength of the knuckle 112c. Each of these knuckle cross sections is taken on a widthwise section plane that is perpendicular to the adjacent conveying surface and in which the axis of the pin hole in the knuckle lies. Assuming that the walls of the knuckles have uniform thickness, the widthwise dimension of knuckle 112c will be twice the widthwise dimension of each of knuckles 112b.

The knuckle cross-section has a significant impact on the strength of the belt, and portion T1 (FIG. 4C) does not significantly affect the strength of the belt.

Referring to FIGS. 5A to 5D, the cross-sectional area S7 (FIG. 5B) of the link base 112A is made equal to the cross-sectional area S8 (FIG. 5D) of any portion of the modular links 111A to 111C having the same widthwise dimension as that of the link base 112A. Thus, the tensile strength of element 112 in the region between the knuckles 112b and 112c is substantially equal to the tensile strength of a corresponding portion, located between the knuckles, of any of the modular link parts 111A, 111B or 111C having the same width as that of the link base 112A.

It is the cross-sectional area S7 (FIG. 5B) that has a significant impact on the strength of the belt. The potion T2, which is remote from link base 112A, does not significantly affect the strength of the belt.

Thus, it is possible to prevent a decrease in the tensile strength of the conveyor belt 110, and to prevent deformation of the link element 112. Further, it is possible to incorporate link elements 112, each with its guide-engaging section, into the conveyor belt at any of a variety of positions and in any of various combinations with other modular links or modular link parts.

Further, since the cross-sectional area of the knuckle 112c having pin hole 112ca is equal to the sum of the cross-sectional areas of the knuckles 112b, each a pin hole 112ba it is possible to optimize the strength of the guide-engaging element without increasing its size or weight.

In addition, since the widthwise cross-sectional area of the link base 112A (FIG. 5B) is made equal to the cross-sectional area of the portion of a modular link part 111A, 111B or 111C having a corresponding width, it is possible to reduce unevenness in the tensile strength of the entire conveyor belt 110.

The invention makes it possible to avoid decrease in the tensile strength of the conveyor belt 110, and to avoid deformation of the guide engaging element 112. Further, it is made possible to incorporate the guide engaging element 112 at any of a variety of positions in the belt and in any of various combinations with modular links or modular link part that have on guide-engaging parts.

While an exemplary embodiment of the invention has been described, it will be appreciated by those skilled in the art that various modifications within the scope and sprit of the invention may be made in the light of the above description, and that the scope of the invention is to be defined by the claims appended hereto.

What is claimed is:

1. A conveyor belt comprising a plurality of modular links arranged sequentially in a longitudinal direction to form an endless loop having an interior, and exterior, a longitudinal direction extending lengthwise around the loop, and a widthwise direction, said modular links being interconnected with one another by connecting pins and cooperatively forming a conveying surface, facing the exterior of the loop, upon which articles to be conveyed may be placed, wherein:

the modular links are composed of synthetic resin;

each modular link has longitudinally spaced leading and trailing edges, a plurality of hinge knuckles having pin-receiving insertion holes, the hinge knuckles being formed on both the leading and trailing edges, and the hinge knuckles on the leading edge being laterally displaced relative to the hinge knuckles on the trailing edge so that the hinge knuckles on the leading edge of each modular link can be interleaved with hinge knuckles on the trailing edge of a preceding modular link having a substantially identical hinge knuckle configuration;

the modular links include a plurality of modular links with no guide-engaging section, and a plurality of modular links each with a guide-engaging section for engagement with a guide rail, each modular link with a guide-engaging section being disposed between a preceding and following modular link with no guide-engaging section;

each of the modular links with a guide-engaging section comprises a link base having a conveying surface and a guide-engaging section protruding toward the inside of said endless loop for engagement with a guide rail disposed along a path of travel of the belt;

each of the modular links with a guide-engaging section comprises plural first link elements, each of said first link elements having more than three hinge knuckles, including plural hinge knuckles on a leading edge and at plural hinge knuckles on a trailing edge, and a second link element, the second link element comprising the guide-engaging section and having only three hinge knuckles, said three hinge knuckles consisting of first and second hinge knuckles that extend from the link element in the longitudinal direction of the belt, and a third hinge knuckle that extends longitudinally in a direction opposite to the direction in which the first and second hinge knuckles extend from said second link element, two pin holes spaced from each other in said widthwise direction of the belt and axially aligned with each other on a common pin hole axis, said two pin holes being formed respectively in said first and second hinge knuckles, and an additional single pin hole formed in said third hinge knuckle, said additional single pin hole of said second link element being positioned at a location such that its projection in the longitudinal direction of the belt is located between the two other pin holes of the same link element;

said second link element in each modular link having a guide-engaging section is formed separately from each other link element of the same modular link and connected to each other link element of said same modular link by a first connecting pin extending through its said two pin holes and a second connecting pin extending through its additional single pin hole, and by interlocking of its hinge knuckles with hinge knuckles of an immediately preceding and following modular link;

the upper surface of each said second link element meets the supporting surfaces of adjacent link elements of the same modular link at the location of the outermost boundaries of the outermost two knuckles of the last-mentioned second link element having only three knuckles; and in each modular link having a guide-engaging section, said second link element thereof is disposed between two of said first link elements of the same modular link.

2. The conveyor belt as set forth in claim 1, wherein, the widthwise spaces between adjacent hinge knuckles in each modular link of the conveyor belt are uniform in width;

wherein, in each said second link element, the cross-sectional area of the third hinge knuckle thereof, taken on a plane in which the axis of the pin hole in said third hinge knuckle lies, is equal to the sum of the cross-sectional areas of said first and second hinge knuckles thereof, taken on a plane in which the common pin hole axis of the pin holes of said first and second hinge knuckles thereof lies; and wherein each of said first and second hinge knuckles of each said second link element extends into a space between hinge knuckles of one of the immediately preceding and following modular links alongside a hinge knuckle of an adjacent first link element of the same modular link of which the last-mentioned second link element is a part.

3. The conveyor belt as set forth in claim 1, wherein the widthwise cross-sectional area of each one of said second link elements between the knuckles thereof, in a modular link having a guide-engaging section, excluding the cross-sectional area of the guide-engaging section thereof, is equal to the widthwise cross-sectional area of a portion of each of the modular link parts without a guide-engaging section, between the knuckles thereof, where said portion has the same width as that of the last mentioned modular link element with a guide-engaging section.

4. A conveyor belt comprising a plurality of modular links arranged sequentially in a longitudinal direction to form an endless loop having an interior, and exterior, a longitudinal direction extending lengthwise around the loop, and a widthwise direction, said modular links being interconnected with one another by connecting pins and cooperatively forming a conveying surface, facing the exterior of the loop, upon which articles to be conveyed may be placed, wherein:

the modular links are composed of synthetic resin;

each modular link has longitudinally spaced leading and trailing edges, a plurality of hinge knuckles having pin-receiving insertion holes, the hinge knuckles being formed on both the leading and trailing edges, and the hinge knuckles on the leading edge being laterally displaced relative to the hinge knuckles on the trailing edge so that the hinge knuckles on the leading edge of each modular link can be interleaved with hinge knuckles on the trailing edge of a preceding modular link having a substantially identical hinge knuckle configuration;

the modular links include a plurality of modular links with no guide-engaging section, and a plurality of modular links each with a guide-engaging section for engagement with a guide rail, each modular link with a guide-engaging section being disposed between a preceding and following modular link with no guide-engaging section;

each of the modular links with a guide-engaging section comprises a link base having a conveying surface and a guide-engaging section protruding toward the inside of said endless loop for engagement with a guide rail disposed along a path of travel of the belt;

each of the modular links with a guide-engaging section comprises plural first link elements, each of said first link elements each of said first link elements having at least one hinge knuckle on a leading edge and at least one hinge knuckle on a trailing edge, and a second link element, the second link element comprising the guide-engaging section and having only three hinge knuckles, said three hinge knuckles consisting of first and second hinge knuckles that extend from the link element in the longitudinal direction of the belt, and a third hinge knuckle that extends longitudinally in a direction opposite to the direction in which the first and second hinge knuckles extend from said second link element, two pin holes spaced from each other in said widthwise direction of the belt and axially aligned with each other on a common pin hole axis, said two pin holes being formed respectively in said first and second hinge knuckles, and an additional single pin hole formed in said third hinge knuckle, said additional single pin hole of said second link element being positioned at a location such that its projection in the longitudinal direction of the belt is located between the two other pin holes of the same link element;

said second link element in each modular link having a guide-engaging section is formed separately from each other link element of the same modular link and connected to each other link element of said same modular link by a first connecting pin extending through its said two pin holes and a second connecting pin extending through its additional single pin hole, and by interlocking of its hinge knuckles with hinge knuckles of an immediately preceding and following modular link;

the upper surface of each said second link element meets the supporting surfaces of adjacent link elements of the same modular link at the location of the outermost boundaries of the outermost two knuckles of the last-mentioned second link element having only three knuckles;

the widthwise spaces between adjacent hinge knuckles in each modular link of the conveyor belt are uniform in width;

in each said second link element, the cross-sectional area of the third hinge knuckle thereof, taken on a plane in which the axis of the pin hole in said third hinge knuckle lies, is equal to the sum of the cross-sectional areas of said first and second hinge knuckles thereof, taken on a plane in which the common pin hole axis of the pin holes of said first and second hinge knuckles thereof lies; and each of said first and second hinge knuckles thereof extends into a space between hinge knuckles of one of the immediately preceding and following modular links alongside a hinge knuckle of an adjacent link element of the same modular link of which said second link element is a part.

\* \* \* \* \*